United States Patent [19]

Cedrone et al.

[11] Patent Number: 4,699,295

[45] Date of Patent: Oct. 13, 1987

[54] VENDING MACHINE WITH IMPROVED FLEXIBILITY OF PRODUCT DISTRIBUTION

[75] Inventors: Louis A. Cedrone, Eastchester; Bruce Vahjen, Yorktown Heights; Richard T. Garton, Croton-On-Hudson, all of N.Y.; Thomas F. Williams, New Canaan, Conn.; Malcolm C. Winsor, Mount Vernon, N.H.

[73] Assignee: PepsiCo Inc., Purchase, N.Y.

[21] Appl. No.: 781,951

[22] Filed: Sep. 30, 1985

[51] Int. Cl.[4] .............................................. B65G 59/06

[52] U.S. Cl. .................................... 221/108; 221/131

[58] Field of Search ..................... 221/131, 11, 14, 67, 221/107, 108, 109, 130, 178, 242

[56] References Cited

U.S. PATENT DOCUMENTS

| | | | |
|---|---|---|---|
| 1,758,333 | 5/1930 | Richardson et al. . | |
| 2,187,233 | 1/1940 | Garner et al. | 312/36 |
| 2,256,976 | 9/1941 | Ford | 221/107 X |
| 2,279,936 | 4/1942 | Brodie et al. | 312/63 |
| 2,336,382 | 12/1943 | Albrecht | 312/36 |
| 2,570,516 | 10/1951 | Bowman | 221/109 X |
| 3,556,284 | 1/1971 | Dyer et al. | 198/138 |
| 3,561,640 | 2/1971 | Thompson | 221/108 |
| 3,627,172 | 12/1971 | Gore et al. | 221/129 |
| 3,737,070 | 6/1973 | O'Neal | 221/6 |
| 3,737,071 | 6/1973 | Offutt et al. | 221/129 |
| 3,752,546 | 8/1973 | O'Neal | 312/35 |
| 3,795,345 | 3/1974 | Baxendale | 221/125 |
| 3,799,393 | 3/1974 | Baxendale | 221/67 |
| 3,831,806 | 8/1974 | Lindsey | 221/1 |
| 3,836,046 | 9/1974 | Bowman | 221/67 |
| 3,894,656 | 7/1975 | Hunter | 221/200 |
| 3,938,700 | 2/1976 | Camp et al. | 221/109 |
| 4,190,179 | 2/1980 | Moss et al. | 221/299 |
| 4,245,755 | 1/1981 | Craven et al. | 221/109 |
| 4,335,832 | 6/1982 | Payne | 221/67 |
| 4,354,615 | 10/1982 | Lindsey | 221/116 |
| 4,354,616 | 10/1982 | Camp | 221/116 |
| 4,454,961 | 6/1984 | Childers et al. | 221/266 |
| 4,460,107 | 7/1984 | Lindsey | 221/67 |

FOREIGN PATENT DOCUMENTS

| | | | |
|---|---|---|---|
| 604231 | 4/1960 | Italy | 221/108 |
| 346514 | 4/1931 | United Kingdom | 221/108 |

*Primary Examiner*—H. Grant Skaggs
*Assistant Examiner*—Edward S. Ammeen
*Attorney, Agent, or Firm*—Scully, Scott, Murphy & Presser

[57] ABSTRACT

A vending machine designed to increase the flexibility of product storage and distribution therein, allowing specific product capacities to be increased or decreased in small increments without a loss of product selection. In the vending machine, a plurality of substantially vertical partitions define a plurality of vertical adjacent columns for product storage, wherein adjacent product storage columns are separated by a vertical partition. A removable product transfer shelf is placed at a selected vertical position in at least one particular product storage column, such that products below the transfer shelf are vended by actuation of the vending mechanism for that particular product column, while products above the transfer shelf are transferred thereby to an adjacent product column to be vended by the vending machine for the adjacent product column. A transfer gate is positioned adjacent to the product transfer shelf in the vertical partition between the particular product column and the adjacent product column. The transfer gate pivotally opens into the adjacent product column after the level of products therein falls below the gate to allow it to open. Thereafter, the product transfer shelf transfers products through the open transfer gate from the particular product column to the adjacent product column.

7 Claims, 11 Drawing Figures

VENDING MACHINE WITH IMPROVED FLEXIBILITY OF PRODUCT DISTRIBUTION

BACKGROUND OF THE INVENTION

1. Field of the Invention

The present invention relates generally to a vending machine arrangement which is designed to increase the flexibility of product storage and distribution therein.

In greater particularity, the subject invention relates to a vending machine for selectively dispensing or vending several different types of products of generally cylindrical configurations, such as products in cans or bottles. More particularly, the invention is concerned with providing improved flexibility for accommodating a given number of products within a limited available storage space, allowing a greater number of at least one preferred product type to be stored and vended, without a decrease in the number of different products available to be selected for vending.

In prior art vending machines, the individual product capacities are generally predetermined by using steel walled columns in the inventory section of the vending machine. By combining columns, bottlers can increase specific product capacity. However, when columns are combined, then the number of products available for selection is proportionately decreased. The present inventive concept allows product capacity to be increased or decreased in smaller increments than is presently possible, without any consequential loss of product selection.

2. Discussion of the Prior Art

The organization of the various essential elements of a product dispensing or vending machine is, in a practical context, influenced by a number of sometimes conflicting considerations, including efficient utilization of the space available for the storage of products to be dispensed, the reliable control over the releasing of individual products from storage upon demand, without vulnerability to either fradulently induced or mechanical malfunctions causing the dispensing of more than one product during each dispending cycle, and providing appropriate means for guide products during feeding thereof from storage to the product dispenser in a manner minimizing vulnerability to jams, and preferably utilizing gravity as the sole force required for accomplishing such feeding of products.

As will be apparent, a maximum number of products can normally be stored within a space of given volume by utilizing the latter essentially as a box or open hopper, with the products emplaced therein in interengaging random fashion. Such an open hopper approach to the storage of products to be mechanically dispensed, however, has been found to be highly vulnerable to the creation of jams as the stored products move toward the lower extremity of the hopper during the successive dispensing operations, and it has also proved difficult to provide a product releasing mechanism for use at the lower end of such an open hopper which is capable of reliably dispensing products stored thereabove in essentially random fashion on a successive individual basis.

Accordingly, over the years, it has become most common to provide some form of product guiding or/and supporting structure within the product storage space available in dispensing or vending machines, for the purpose of preventing the type of jamming problems that can arise with open hopper storage, while preferably accomplishing this in a manner that requires the interposition within the storage space of a minimum amount of guiding and support structure, which occupies a minimum portion of the space otherwise available for the storage of the products themselves.

Prior art vending machines typically offer a consumer a selection from several different varieties of products, such as different flavors and varieties of canned soft drink beverages. Heretofore, such selective machines have most commonly employed a plurality of side by side stacked arrangements of products within corresponding chambers extending throughout the height of the available product storage space, with each serviced by its own selectively operable dispensing or releasing mechanism. That type of arrangement, has indeed, proved entirely satisfactory for applications in which it is intended that each of the selectively available varieties of product will be handled by the machine in essentially equal quantities.

However, it is recognized that the tastes of consumers utilizing a vending machine as a source of products such as canned soft drinks, will not result in statistically equal selections of the various varieties of products offered by the machine. On the contrary, each kind of product will generally be consumed in quantities different from that of any other product variety offered through a given machine during any given period of typical operation. In recognition of the biased nature of consumer demand in favor of one or a small number of the product varieties commonly offered through a single dispensing or vending machine, the common prior art solution has been simply to dedicate a plurality of the individual stacked chambers and associated releasing mechanisms to the dominant or favored products, with the remaining products each being serviced by only a single such chamber and dispensing mechanism. Although this approach permits product variety preferences of consumers to be in some measure accommodated, such solution has been less than fully satisfactory because of the difficulty of providing both an adequate number of selections and an appropriate mix of the respective quantities of each of the product varieties to be made available through a particular machine. For example, assuming a vending machine with ten stacked chambers of equal height across the width of the machine, each of such chambers accommodates ten percent of the total products receivable within the product storage space of the machine, which marks the minimum percentage of the storage space to be devoted to any particular product variety to multiples of ten percent, and would also result in a commensurate decrease in the number of product varieties dispensed by the machine.

Craven et al. U.S. Pat. No. 4,245,755 is of particular interest to the subject invention as it addresses the same general problem as that of the present invention, namely allocation of product storage space in a canned beverage vending machine between major and secondary products. The approach taken therein is illustrated clearly in FIG. 2, wherein secondary products are vended from the left vertical columns, a favored secondary product is vended from the second-from-the-right column, which has access to a major portion of the product storage area. Pivotally mounted gates are employed during delivery to direct the major product cans from several storage shelves to the right vending column. The present invention provides a much greater flexibility of product storage and distribution relative to this prior art approach.

SUMMARY OF THE INVENTION

Accordingly, it is a primary object of the present invention to provide a vending machine arrangement designed to increase the flexibility of product storage and distribution therein, allowing specific product capacities to be increased or decreased in small increments without a loss of product selection.

In greater particularity, the vending machine includes a plurality of substantially vertical partitions defining a plurality of vertical adjacent columns for product storage, wherein adjacent product storage columns are separated by a vertical partition. Pursuant to the teachings of the present invention, a removable product transfer shelf is placed at a selected vertical position in at least one particular product storage column, such that products below the transfer shelf are vended by actuation of the vending mechanism for that particular product column, while products above the transfer shelf are transferred thereby through a product transfer opening in the vertical partition to an adjacent product column to be vended by the vending mechanism for that product column. A transfer gate is positioned adjacent to the product transfer shelf in the product transfer opening in the vertical partition between the particular product column and the adjacent product column. The transfer gate pivotally opens into the adjacent product column after the level of products therein falls below the gate to allow it to open. Thereafter, the product transfer shelf transfer products from the particular product column to the adjacent product column through the open transfer gate.

Moreover, in a preferred embodiment, the vertical partitions define a plurality of vertically staggered support positions for the transfer shelf, such that each selected position defines a different selected number of products above the transfer shelf which are transferred thereby to the adjacent product column. Also, preferably the plurality of vertically staggered support positions are defined by a plurality of vertically staggered apertures or slots in the partition wall.

Additionally, in the preferred embodiment, several, and preferably all, of the product columns in the vending machine are provided with a removable product transfer shelf, selectively positionable at different heights therein and an associated product transfer gate for each different height position.

A preferred embodiment of a product transfer gate is disclosed herein in which the transfer gate comprises first and second gate plates pivotally connected together substantially along the tops thereof. The product transfer gate is designed to alleviate a possible problem with the weight of the products in the particular product column forcing the transfer gate to open improperly in a manner which might jam the flow of products being vended by the adjacent product column. In this design the first gate plate is spring biased open into the adjacent product storage column after the level of products in the adjacent column falls therebelow, and opening of the first gate plate causes an unlatching of the second gate plate to allow it to open into the adjacent product column also, but only after the first gate plate has opened.

In greater detail, the first gate plate has a first pivotal mounting at the top thereof to pivotally mount it relative to the vertical partition, and the second gate plate is pivotally mounted relative to the first gate plate by a second pivotal mounting located below the first pivotal mounting. The second gate plate is latched by a bottom latch to the vertical partition, such that when the first gate plate pivotally opens about the first pivotal mounting, the second gate plate is lifted by the second pivotal mounting to unlatch the bottom latch, thereby allowing the second gate plate to pivotally open only after opening of the first gate plate.

The second gate plate bottom latch includes at least one vertically depending first bottom tab which extends downwardly adjacent to the partition on the side thereof facing the one particular product storage column. The second gate plate bottom latch also includes at least one vertically depending second bottom tab which is angled relative to the second gate plate to extend through the product transfer opening and then downwardly adjacent to the partition on the side thereof facing the adjacent product column.

Moreover, the first gate plate is also provided with a bottom latch comprising at least one vertically depending bottom tab which is angled relative to the first gate plate to extend through the product transfer opening and then downwardly adjacent to the partition on the side thereof facing the one particular product storage column. The first gate plate latch is interlocked with a removable product transfer shelf as described hereinbelow to allow it to be latched only when the transfer gate is not being used with an adjacent product transfer shelf.

A removable product transfer shelf is designed to operate and interlock with the preferred embodiment of the product transfer gate. The removable product transfer shelf includes at least one vertically depending first bottom tab which is angled downwardly relative to the product transfer shelf to lie adjacent to the partition on the side thereof facind the one particular product column. Moreover, at least one vertically depending second bottom tab is angled downwardly relative to the product transfer shelf to extend through the product transfer opening and then downwardly adjacent to the partition on the side thereof facing the adjacent product column, such that the first and second bottom tabs of the product transfer shelf mount the product transfer shelf relative to the product transfer opening in the partition. In this design, the first bottom tab of the product transfer shelf abuts the bottom latch tab of the first gate plate to prevent it from extending through the product transfer opening when the product transfer shelf is mounted therein, such that the first gate can be latched relative to the partition only when an adjacent product transfer shelf is not mounted therein.

BRIEF DESCRIPTION OF THE DRAWINGS

The foregoing objects and advantages of the present invention for a vending machine with improved flexibility of product distribution may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
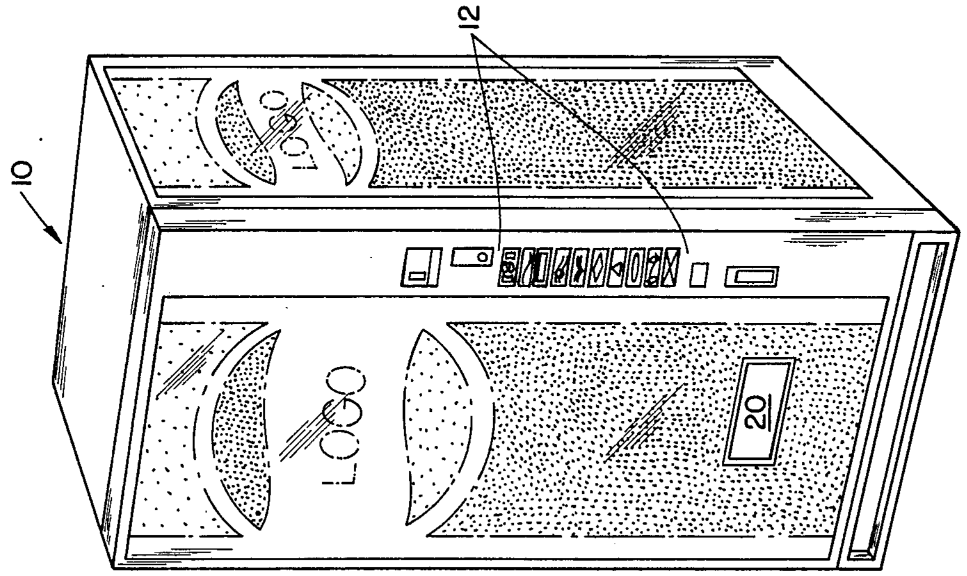
FIG. 1 is a front perspective view of an exemplary vending machine which can be constructed pursuant to the teachings of the present invention.

Referring to the drawings in detail, FIG. 1 is a front perspective view of an exemplary vending machine 10 which can incorporate the subject matter of the present invention. The vending machine front display panel has ten product selection buttons 12 thereon, each of which controls vending of products from one of ten vertical columns 14 of stacked products (e.g. soft drink cans). The stacked columns 14 of product are defined by vertically positioned partition walls 15, positioned at regularly spaced intervals across the width of the vending machine. Each product column includes a dispensing mechanism 16 for controlling the dispensing of products from that column, pursuant to the selection indicated by depression of the proper product selection switch or button. All of the product columns dispense into a common product chute 18 which feeds into a product delivery area 20. All of the structure described in detail hereinabove is essentially descriptive of the prior art.

Figure 3:
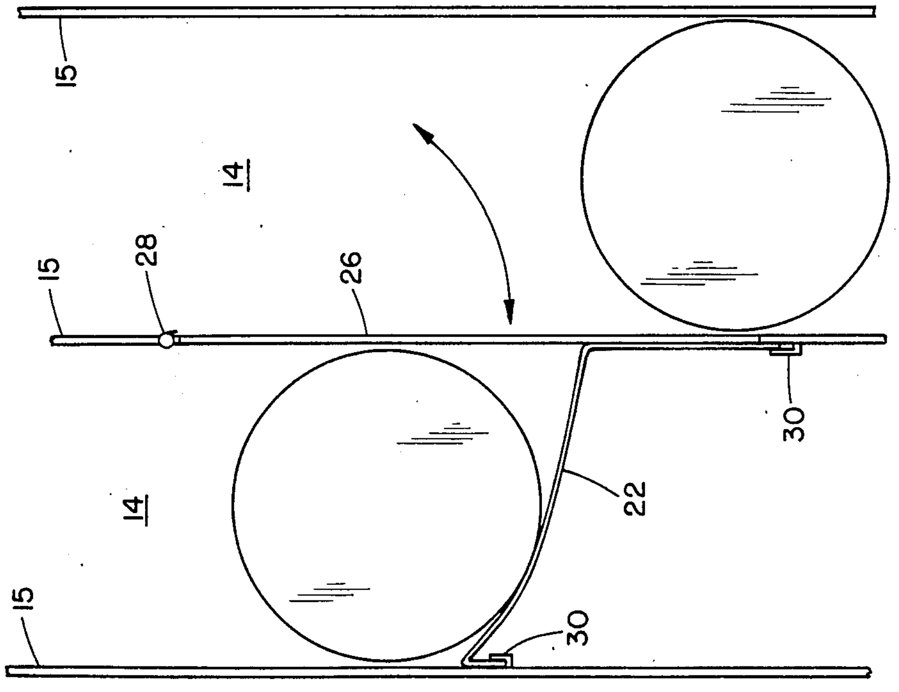
FIGS. 3 and 4 illustrate detailed enlargements of the detail circle 3, 4 in FIG. 1, which illustrates a first embodiment of the present invention.
Figure 4:
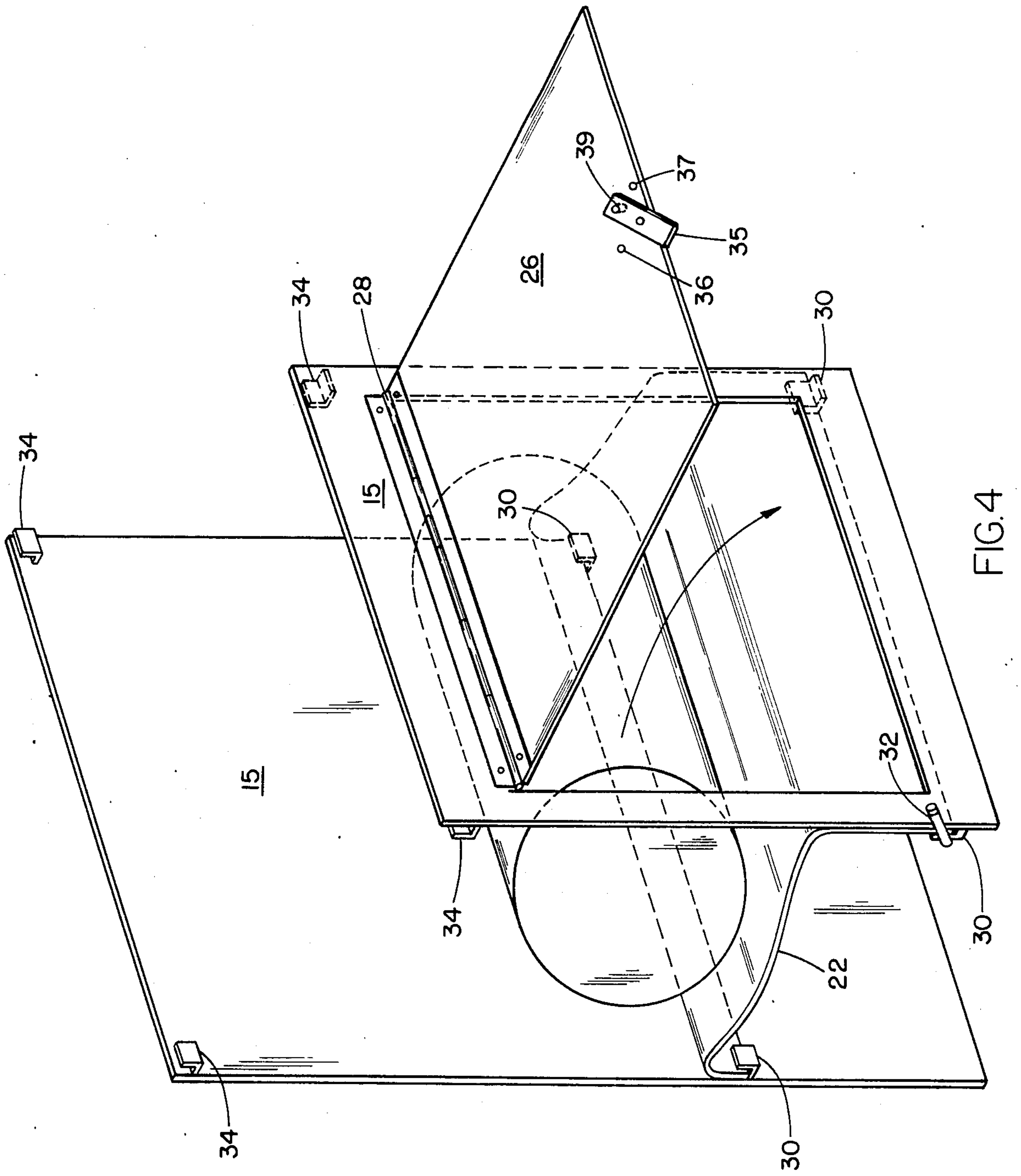

FIGS. 3 and 4 are respectively detailed front elevational and perspective views of the detail circle 3, 4 in FIG. 1, with cans of product being shown therein for purposes of illustration, showing details of a first exemplary embodiment of the present invention. Pursuant to the teachings herein, a removable product transfer shelf 22 is placed at a selected vertical position in the second-from-the-right product storage column 14. Products below the transfer shelf 22 are vended in a normal manner by actuation of the vending mechanism for that particular product column. However, products above the transfer shelf 22 are held immobile above the transfer shelf 22 until products in the adjacent right column are vended to the extent that the uppermost product until 24 therein drops below a transfer gate 26 associated with the transfer shelf 22. The transfer gate 26 is positioned adjacent to the product transfer shelf 22 in the vertical partition 15 between the next to the right product column and the adjacent right product column. When the uppermost product unit 24 in the right column falls below the transfer gate, the gate opens about hinge 28, either under the weight of the products above the transfer shelf bearing against the gate or in conjunction with a hinge spring biasing the gate open. Thereafter, the product transfer shelf transfers products through the open transfer gate from the second-from-the-right product column to the adjacent right product column.

The product transfer shelf can be supported in the product column in any convenient manner. For instance, four L shaped clips 30 can be attached to the opposite inner surface of the vertical partitions 15 as shown. The clips are sufficiently small that they do not interfere with the downward movement of product in the column when the product transfer shelf is removed. One or more lock pins 32 can also pass through the partition wall 15, transfer shelf 22 and clip 30 to ensure positive engagement and placement of the product transfer shelf.

Moreover, in a preferred embodiment, the vertical partitions 15 define a plurality of vertically staggered support positions for the transfer shelf, as by the second set of support clips 34, such that each selected position defines a different selected number of products above the transfer shelf which are transferred thereby to the adjacent product column. The vertically staggered support positions can be defined for a given number of product displacements, two in FIG. 4, along the height of the product column. Each support position is provided with an associated product transfer gate. Each gate is provided with a latch 35 of any appropriate type to latch the transfer gate in a closed position. The illustrated latch 35 includes attached latching plates on both sides of the transfer door and partition, mounted for rotational movement. Moreover, a fully locked aperture 36, and fully open aperture 37 can engage a protruding pin 39 of the latch to positively hold the latch in either position. After the product transfer shelf 22 is placed at a selected height in the product column, only the transfer gate adjacent the transfer shelf would be unlatched to its open position.

Figure 5:
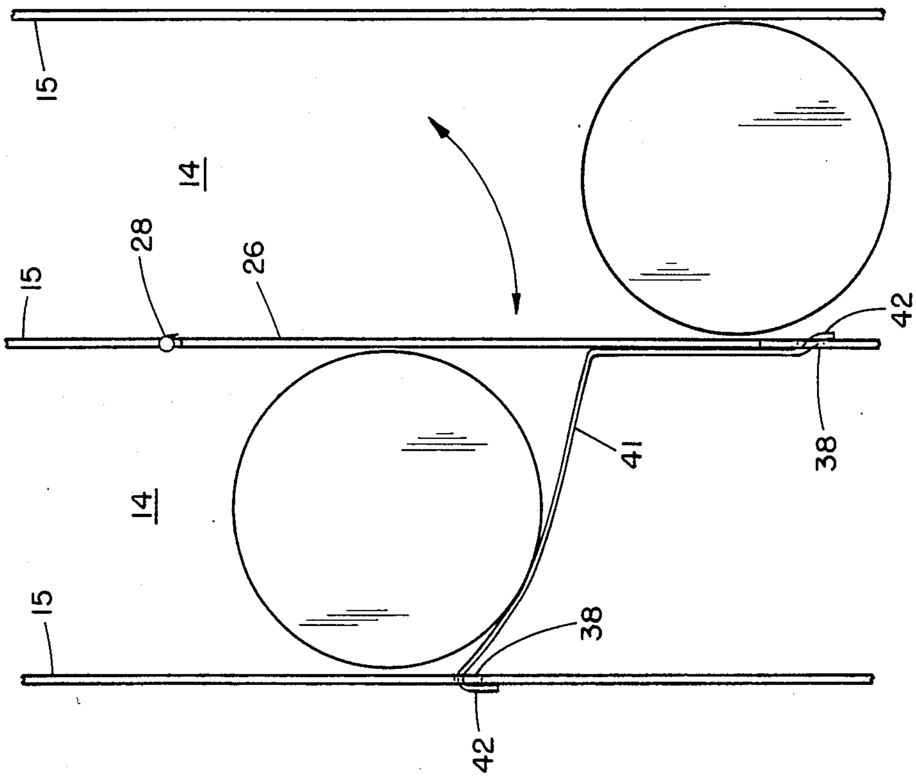
FIGS. 5 and 6 illustrate detailed enlargements of the detail circle 5, 6 in FIG. 1, which illustrates a second embodiment of the present invention.
Figure 6:
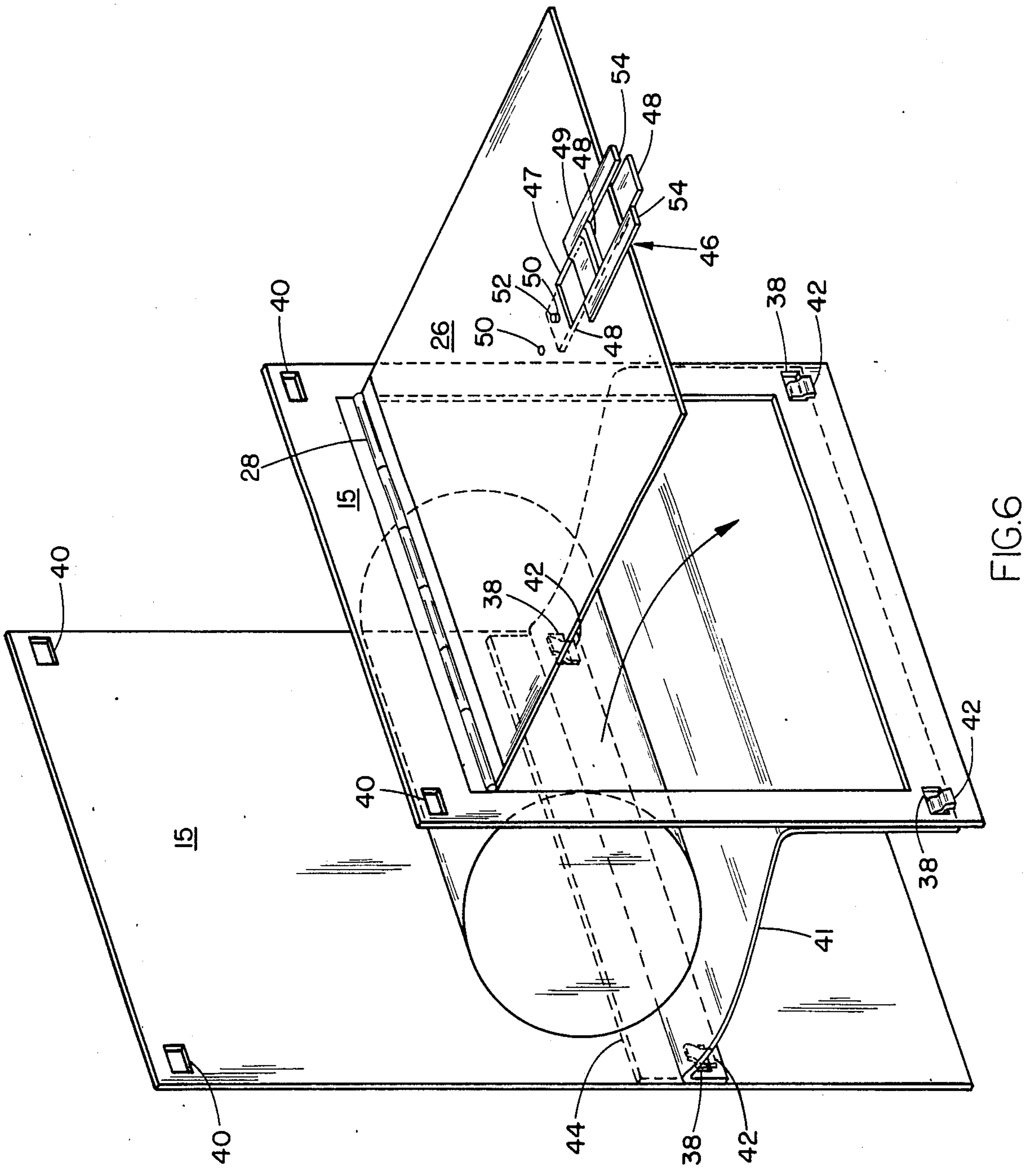

FIGS. 5 and 6 illustrate an advantageous support arrangement for a slightly different embodiment of a product transfer gate 41. In this embodiment, a plurality of vertically staggered support positions are defined by a plurality of vertically staggered apertures or slots 38, 40 in the partition wall, and thus are easily formed therein. Moreover, no protrusions exist to possibly jam the vertical column of products. The removable product transfer shelf 41 can be constructed from sheet metal, and is provided with cut and bent corner tabs 42 which pass through and lock onto the bottom edges of the slots 38 or 40. It should also be recognized that the lower set of slots 38 and corner tabs 42 are entirely adequate to support the product transfer shelf in place, and the rear portion (as shown in FIG. 6) of the transfer shelf can merely rest against the rear partition wall (in FIG. 6), and possibly be curved to be tangential therewith, a illustrated in phantom at 44 therein.

The latch 46 in this embodiment mounts in a vertically extending slot 47 in the transfer gate 26. A central vertically slideable plate 48 is mounted on one side of the transfer gate 26, and a vertically slidable U shaped member 49 is mounted on the other side of the transfer gate 26. The base of the U is depressed into the slot 47 to join plate 48 and to limit and allow movement of the members 48, 49 along the slot. Locking apertures 50 are provided above the slot 47, and a pin 52 on the latch plate is positionable in either locking aperture 50 to positively lock the transfer gate in either locked or openable positions. In the locked position, the lower locking aperture 50 and pin 52, and the lower plate 48 and depending legs 54 of the U member 49 of opposite sides of the partition 50, securely latch the transfer gate 26 from pivoting in either direction, although in some embodiments the hinge 28 could prevent rotation of the transfer gate 26 in one direction.

Figure 2:
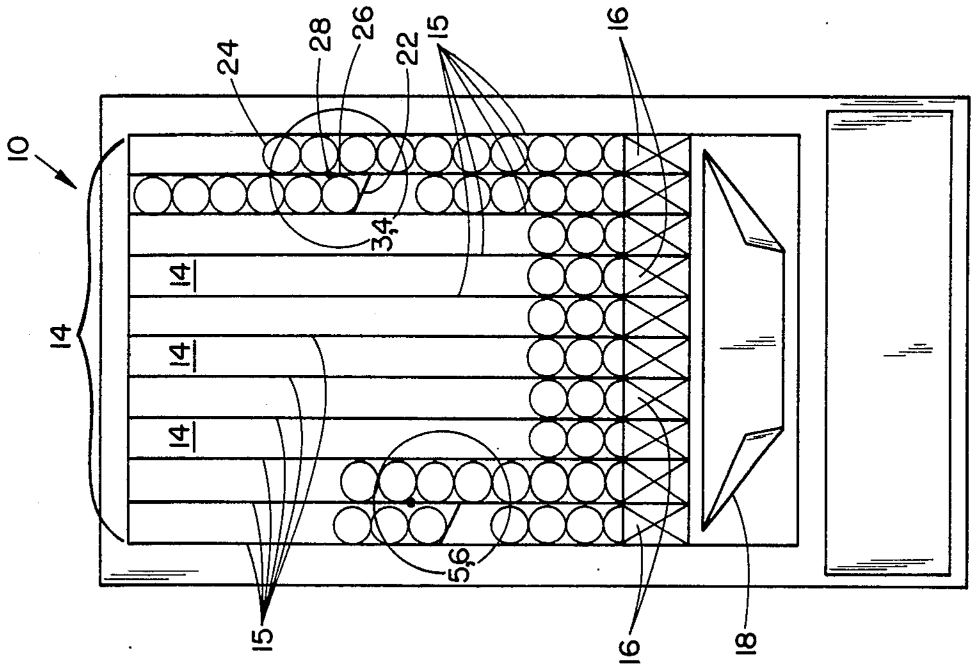
FIG. 2 is a schematic illustration of the vending columns in the machine of FIG. 1, with the front door of the machine being open.

Additionally, in a preferred embodiment as illustrated in FIG. 2, several or even all, of the product columns in the vending machine can be provided with a removable product transfer shelf, selectively positionable at different heights therein and an associated product transfer gate for each different height position.

It should also be realized that more than two vending columns can be utilized to feed a single dispensing mechanism by providing two or more successively lower product transfer shelves and associated transfer gates in successive product columns.

The design of the present invention utilizes a series of product gates and removable product transfer shelves. The product transfer shelf is designed to easily snap into place. The gates are locked in a closed position when not in use. When in use, the gates are left in an unlocked position, and are opened when column inventory is lowered to the self-opening position. The gate then transfers product from the adjacent column to the dispensing column.

Figure 7:
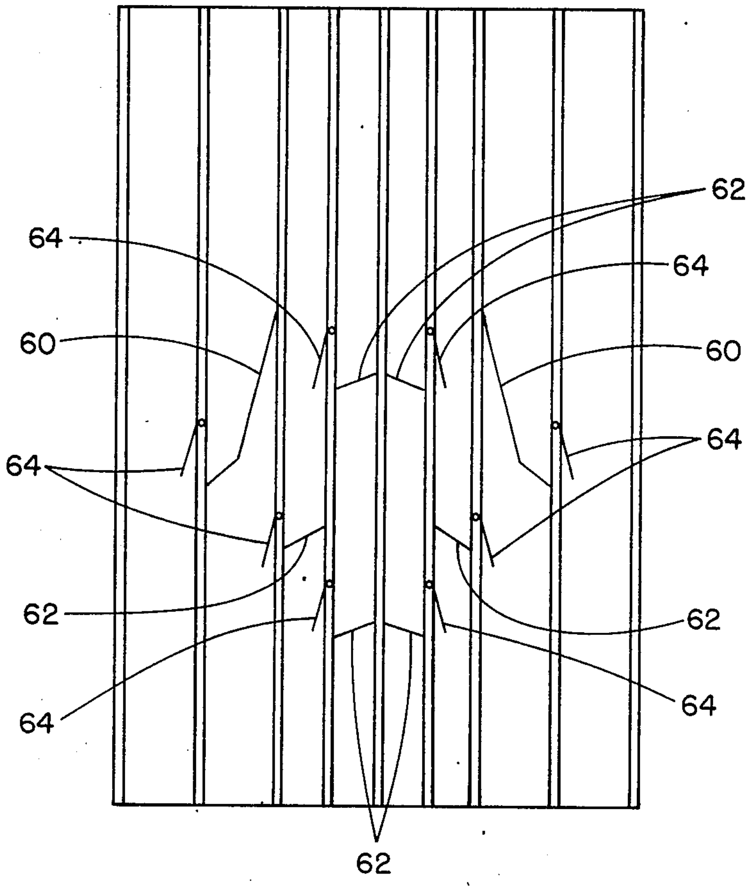
FIG. 7 is a schematic illustration of another embodiment of an exemplary vending machine fitted with product transfer shelves and gates constructed pursuant to the teachings of the subject invention.

FIG. 7 is a schematic illustration of another embodiment of an exemplary vending machine having therein several product transfer shelves and gates constructed pursuant to the teachings of the subject invention. The vending machine includes relatively wide first, second, seventh and eighth product vending columns in which standard beverage cans are loaded into the machine in staggered left and right positions, with the wider columns being provided for relatively fast selling beverage choices. The third, fourth, fifth and sixth product vending columns are relatively narrow, and the beverage cans therein are stacked substantially one on top of the other, and are suitable for relatively slow selling product choices.

An elongated double ramp product transfer shelf 60 is placed in the second and seventh product columns, and single ramp product transfer shelves 62 are placed in the third, fourth, fifth and sixth product columns. A product transfer gate 64 is positioned in the product column partition adjacent to each product transfer shelf, as illustrated. The possible placements of the shelves in FIG. 7 are illustrative of different possible vending arrangements, and they are all shown simultaneously in FIG. 7 merely for purposes for illustration.

Figure 8:
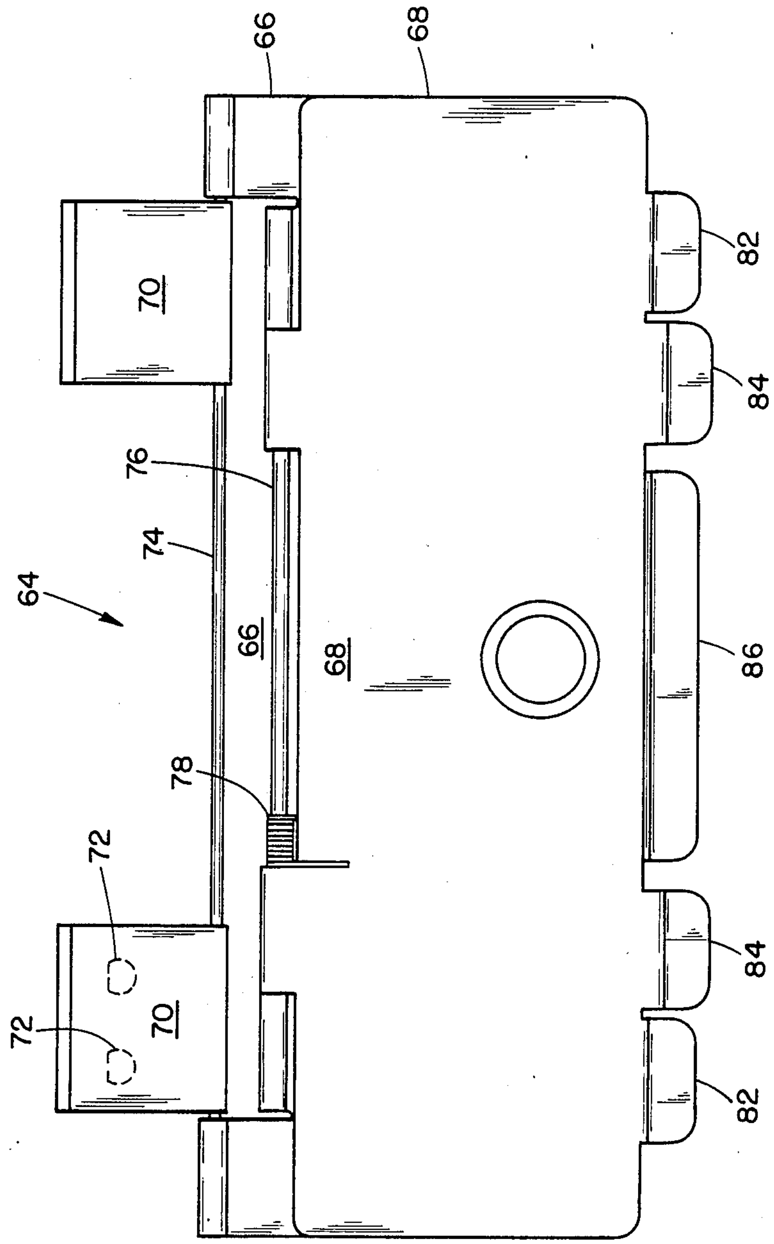
FIGS. 8 and 9 are respectively plan and end views of a preferred embodiment of a product transfer gate constructed pursuant to the teachings of the present invention.
Figure 9:
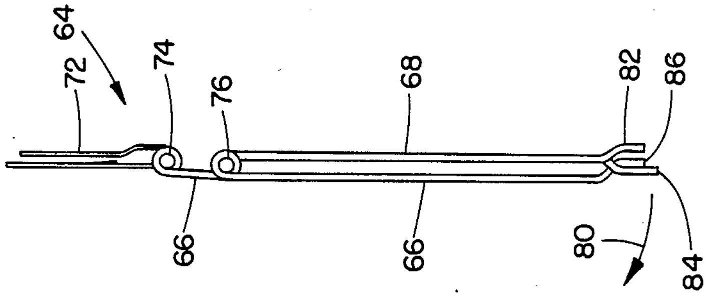

FIGS. 8 and 9 are respectively plan and left end views of a preferred embodiment of a product transfer gate 64 constructed pursuant to the teachings of the present invention. In the preferred embodiment, the product transfer gate 64 comprises first and second gate plates 66 and 68 pivotally connected together substantially along the tops thereof. There product transfer gate is designed to alleviate a possible problem with the weight of the products in the particular product column forcing the transfer gate to open improperly in a manner which might jam the flow of products being vended by the adjacent product column.

The transfer gate is placed in a product transfer opening in a partition wall of the vending machine which is slightly longer than the length of the product transfer shelf and gate and approximately the height of the product transfer gate. The product transfer gate 64 is removably mounted to the partition by spring clips 70 which can have partially punched protrusions 72 therein for engaging corresponding mounting holes provided in the partition above the product transfer gate. The clips 70 are rotatably mounted about a first gate hinge pin 74 which forms part of a first pivotal mounting which pivotally mounts the first gate plate relative to the vertical partition. The second gate plate is pivotally mounted to the first gate plate by a second pivotal mounting, including a second gate hinge pin 76, located below the first pivotal mounting. A biasing spring 78 is mounted about the second gate hinge pin 76, and biases the first and second gate plates angularly apart, and in operation serves to bias the first gate plate 66 open.

In this design, the first gate plate 66 is spring biased open into the adjacent product storage column after the level of products in the adjacent column falls therebelow, and the opening of the first gate plate 66 causes an unlatching of the second gate plate 68 to allow it to open about hinge pin 76 into the adjacent product column also, after the first gate plate has opened.

The second gate plate 68 is latched by a bottom latch to the vertical partition, such that when the first gate plate 66 pivotally opens in the direction of arrow 80 about the first pivotal mounting formed by hinge pin 74, the second gate plate is lifted by the second pivotal mounting formed by hinge pin 76 to unlatch the bottom latch, thereby allowing the second gate plate to pivotally open only after the first gate plate has opened.

The bottom latch of the second gate plate includes two spaced vertically depending first bottom tabs 82 which are angled relative to the second gate plate to extend downwardly adjacent to the partition on the side thereof facing the one particular product storage column. The second gate plate bottom latch also includes two spaced vertically depending second bottom tabs 84 which are angled relative to the second gate plate to extend through the product transfer opening adjacent to the partition on the side thereof facing the adjacent product column.

The first gate plate 66 is also provided with a bottom latch comprising a centrally located vertically depending bottom tab 86 which is angled relative to the first gate plate to extend through the product transfer opening adjacent to the partition on the side thereof facing the particular product storage column.

Figure 11:
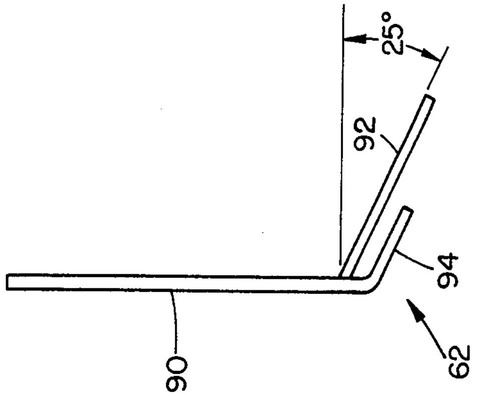
FIGS. 10 and 11 are respectively plan and end views of a preferred embodiment of one product transfer shelf shown in FIG. 7.
Figure 10:
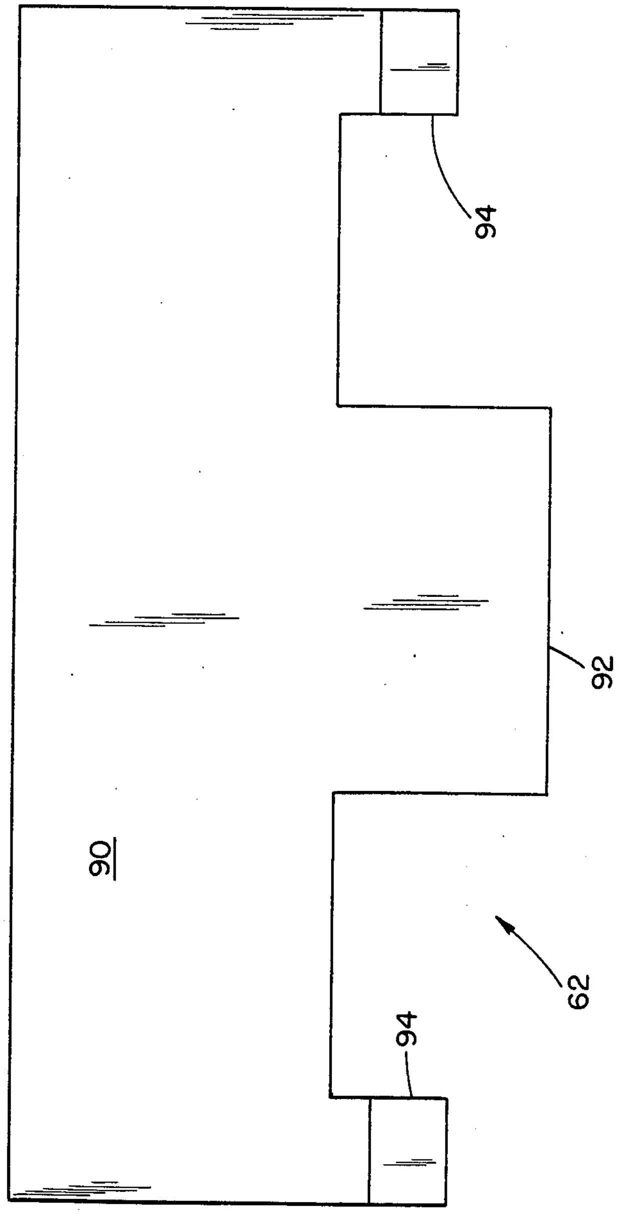

FIGS. 10 and 11 are respectfully plan and right end views of one of the single ramp product transfer shelves 62 shown in FIG. 7. The shelf 62 is slightly longer than the product transfer gate 64 and includes a flat angled portion 90 which is the portion thereof mainly visible in FIG. 7. The removable product transfer shelf 62 has been designed to operate and interlock with the preferred embodiment of the product transfer gate 64. The removable product transfer shelf includes a central vertically depending bottom tab 92 which is angled downwardly relative to the product transfer shelf to lie adjacent to the partition on the side thereof facing the one particular product shelf. Moreover, two second vertically depending bottom tabs 94 are angled downwardly relative to the product transfer shelf to extend through the product transfer opening adjacent to the partition on the side thereof facing the adjacent product column, such that the first and second bottom tabs of the product transfer shelf mount the product transfer shelf properly relative to the product transfer opening in the partition. In this design, the first bottom tab 92 of the product transfer shelf abuts the central bottom latch tab 86 of the first gate plate to prevent it from extending through the product transfer opening when the product transfer shelf is mounted in the product transfer opening.

In this design, when a product transfer gate provided for a vending machine is not being utilized, an associated product transfer shelf is not placed adjacent thereto in the product transfer opening. This allows the gate to rest on the bottom of the product transfer opening with the latch tabs 82, 84 and 86 thereby locking the gate in a nonoperative and noninterfering position in the partition.

When a transfer gate is to be utilized, a transfer shelf is placed in the product opening, and the bottom tab 92 thereof prevents the central latch tab 86 of the first gate plate from extending through the product transfer opening and latching thereto. Instead, the central latch tab 86 rests on the bottom of the product transfer opening, such that after the level of the containers in the adjacent vending column fall therebelow, the first plate is spring biased open, thereby lifting the second gate plate from its bottom latch, and allowing the second gate plate to be forced open by the weight of the containers above the transfer shelf bearing against the second gate plate.

The elongated double ramp product shelves 60 are designed with bottom support tabs and structure similar to the single ramp product transfer shelf 62 illustrated in FIGS. 10 and 11.

While several embodiments and variations of the present invention for a vending machine with improved flexibility of product distribution are described in detail herein, it should be apparent that the disclosure and teachings of the present invention will suggest many alternative designs to those skilled in the art.

What is claimed is:

1. A vending machine arrangement designed to increase the flexibility of product storage and distribution therein, allowing specific product capacities to be increased or decreased in small increments without the loss of product selection, comprising:

a. a plurality of substantially vertical adjacent columns for product storage, wherein adjacent product storage columns are separated by a vertical partition, and each product storage column having a vending mechanism associated therewith;

b. the vertical partition between at least one particular product column and an adjacent product column defining a plurality of vertically spaced product transfer openings therein;

c. a removable product transfer shelf placed at a vertical position in said at least one particular product storage column, wherein products below the transfer shelf are vended by actuation of the vending mechanism for said at least one particular product column, and products above the transfer shelf are transferred by the shelf to an adjacent product column to be vended by a vending mechanism for another product column, said removable product transfer shelf including at least one vertically depending first bottom tab which is angled downwardly relative to the product transfer shelf to lie adjacent to the partition on a side thereof facing said at least one particular product column, and at least one vertically depending second bottom tab which is angled downwardly relative to said product transfer shelf to extend through one of said plurality of product transfer openings adjacent to the partition on a side thereof facing said adjacent product column, such that the first and second bottom tabs of the product transfer shelf mount the product transfer shelf relative to any one of said plurality of product openings in the partition, such that the plurality of vertically spaced product transfer openings define a plurality of vertically spaced support positions for the transfer shelf, with each vertically spaced support position being associated and adjacent to one of the plurality of vertically spaced product transfer openings, whereby a selected position for the transfer shelf defines a selected number of products above the transfer shelf which are transferred thereby to the adjacent product column; and d. a separate transfer gate, associated with the product transfer shelf, positioned in each of said plurality of product transfer openings in the vertical partition between the at least one particular product column and the adjacent product column; such that each of said plurality of product transfer openings has a separate transfer gate therein, to provide one of said plurality of vertically spaced transfer gates in said each of the plurality of vertically spaced product transfer openings, and each said separate transfer gate being movable out of a respective one of said plurality of product transfer openings to allow the product transfer shelf located at said selected position in a selected one of said plurality of product transfer openings to transfer products above the product transfer shelf from the at least one particular product column to the adjacent product column through said selected one of said plurality of product transfer openings.

2. A vending machine arrangement designed to increase the flexibility of product storage and distribution therein, allowing specific product capacities to be increased or decreased in small increments without the loss of product selection, as claimed in claim 1, wherein several particular product columns in the vending machine are provided with a removable product transfer shelf, and each of said several particular product columns having a vertical partition between said each particular product column and an adjacent product column, having a plurality of vertically spaced transfer openings therein, each of which has a separate transfer gate therein.

3. A vending machine arrangement designed to increase the flexiblity of product storage and distribution therein, allowing specific product capacities to be increased or decreased in small increments without the loss of product selection, as claimed in claim 1, each said separate transfer gate being pivotally openable into the adjacent product column after the level of products in the adjacent product column falls below the gate to allow it to open, after which the product transfer shelf transfers products above the product transfer shelf from the at least one particular product column to the adjacent product column through the open transfer gate, and each said transfer gate comprising first and second gate plates connected together substantially along the tops thereof, said first gate plate opening into the adjacent product storage column after the level of products in the adjacent column falls below the first gate plate to allow it to open, said first gate plate having a first pivotal mounting at the top thereof to pivotally mount it relative to said vertical partition, and means for spring biasing said first gate plate to open about said first pivotal mounting into said adjacent product column, said second gate plate being pivotally mounted to said first gate plate by a second pivotal mounted located below said first pivotal mounting, and said second gate plate including bottom latch means for latching it to said vertical partition at the bottom of said second gate plate, such that when said first gate plate pivotally opens into the adjacent product column about said first pivotal mounting, the first gate plate lifts said second gate plate by said second pivotal mounting to lift said second gate plate from said bottom latch means, thereby allowing said second gate plate to pivotally open into the adjacent product column after said first gate plate has opened.

4. A vending machine arrangement designed to increase the flexibility of product storage and distribution therein, allowing specific product capacities to be increased or decreased in small increments without the loss of product selection, as claimed in claim 3, said second gate plate bottom latch means comprising at least one vertically depending first bottom tab which can engage said partition at the bottom of said second gate plate, said at least one vertically depending first bottom tab extending downwardly adjacent to said partition on the side thereof facing said at least one particular product storage column.

5. A vending machine arrangement designed to increase the flexibility of product storage and distribution therein, allowing specific product capacities to be increased or decreased in small in small increments without the loss of product selection, as claimed in claim 4, said second gate plate bottom latch means comprising at least one vertically depending second bottom tab which can engage said partition at the bottom of said second gate plate, with said at least one vertically depending second bottom tab being angled relative to said second gate plate to extend through said one of said plurality of product transfer openings adjacent to said partition on the side thereof facing said adjacent product column.

6. A vending machine arrangement designed to increase the flexibility of product storage and distribution therein, allowing specific product capacities to be increased or decreased in small increments without the loss of product selection, as claimed in claim 5, said first gate plate having a bottom latch comprising at least one vertically depending bottom tab which can engage said partition at the bottom of said first gate plate, said first gate plate bottom tab being angled relative to said first gate plate to extend through said one of said plurality of product transfer openings adjacent to said partition on the side thereof facing said at least one particular product storage column.

7. A vending machine arrangement designed to increase the flexibility of product storage and distribution therein, allowing specific product capacities to be increased or decreased in small increments without the loss of product selection, as claimed in claim 6, said at least one first bottom tab of said product transfer shelf abutting said vertically depending bottom tab of said first gate plate to prevent it from extending through said selected one of said plurality of product transfer openings to latch against the side of the partition facing said at least one particular product storage column when said product transfer shelf is mounted in said selected of said plurility of product transfer openings in the partition, such that said first gate plate can be latched relative to the partition only when said product transfer shelf is not mounted in said selected one of said plurality of product transfer openings in the partition.

* * * * *